United States Patent [19]

Koyama et al.

[11] Patent Number: 4,801,963

[45] Date of Patent: Jan. 31, 1989

[54] FOCUS DETECTING SYSTEM

[75] Inventors: Takeshi Koyama; Keiji Ohtaka, both of Tokyo, Japan

[73] Assignee: Canon Kabushiki Kaisha, Tokyo, Japan

[21] Appl. No.: 941,308

[22] Filed: Dec. 15, 1986

[30] Foreign Application Priority Data

Dec. 18, 1985 [JP] Japan ............................. 60-285001
Dec. 2, 1986 [JP] Japan ............................. 61-287078

[51] Int. Cl.⁴ ......................... G03B 3/00; G03B 15/03
[52] U.S. Cl. .................................. 354/403; 354/126; 250/201
[58] Field of Search ............... 354/62, 163, 165, 403, 354/409, 126, 195.1, 404, 405; 356/4; 250/204, 207

[56] References Cited

U.S. PATENT DOCUMENTS 2,642,790 6/1953 Scholkemeier ............... 354/195.1
3,418,908 12/1968 Land ............................ 354/165
4,185,191 1/1980 Stauffer ........................ 250/204
4,690,538 9/1987 Matsui et al. ................. 354/403

FOREIGN PATENT DOCUMENTS 479287 12/1951 Canada ........................ 354/165
4919810 5/1971 Japan .
54-159259 12/1979 Japan .
55-155331 12/1980 Japan .
57-154206 9/1982 Japan .
58-106511 6/1983 Japan .

*Primary Examiner*—L. T. Hix
*Assistant Examiner*—David M. Gray
*Attorney, Agent, or Firm*—Fitzpatrick, Cella, Harper & Scinto

[57] ABSTRACT

A focus detecting system having a focus detecting apparatus for performing focus detection based on the output signal from a photo-sensing device, and a pattern projector for projecting a pattern onto an object, wherein the aforesaid pattern is so arranged that the spatial frequency lowers successively.

27 Claims, 3 Drawing Sheets $t_{min}$

FOCUS DETECTING SYSTEM

BACKGROUND OF THE INVENTION

Field of the Invention

This invention relates to pattern projectors for automatic focus detection suited to photographic cameras, cine cameras, or video cameras, and more particularly to the improvement of focus detection accuracy in the so-called passive type automatic focus detection with the measurement of a degree of sharpness of an object image formed by the objective lens.

Description of the Related Art

The focus detection systems which are classified into two main groups have been used in photographic cameras, cine cameras, or video cameras.

One group is the passive type as proposed, for example, in Japanese Laid-Open Patent Application No. Sho 54-159259, and another one is the active type as proposed for example, in Japanese Laid-Open Patent Application No. Sho 57-154206.

Of these, the active type is to project a light beam, for example, an infrared light beam, from the camera onto an object to be photographed and receive the reflected light beam from the object while the projected light beam is scanning in synchronism with the light receiving element, when the focus detection is performed, having a merit that even if the object space is dim, or even if the contract of the object is low, the focus detection can be performed with a relatively high accuracy. But, with an object at a long distance from the camera, because the projected light beam does not fully reach, or because the amount of light reflected from the object is not sufficient, there is a demerit that the accuracy of focus detection comes to be low.

The passive type is to perform focus detection be sensing the sharpness of the object image formed on detecting means by the photographic system, having a merit that even when the object distance is very long, focus detection of relatively high accuracy can be performed. However, if the object space is dim, or the contast of the object is low, because the sharpness of the object image is difficult to detect well, there is a drawback that the accuracy of focus detection comes to lower. One method of improving this drawback has been proposed in, for example, Japanese Laid-Open Patent Application No. Sho 49-19810. One of the techniques of this kind is to project a random pattern from the camera onto the object by a light projecting system and sense the reflected pattern image from the object when the focus detection of the photographic lens is performed. However, in the photographic lenses, particularly those in the single lens reflex cameras, there is a wide variety of focal lengths as the photographic lens is interchanged. And, recently, the ordinary use of zoom lenses is becoming prevalent.

Therefore, in the method using the random pattern, both projection and reception of an image of the pattern must be performed through the photographic lens, or by the so-called "full-TTL" method. Or otherwise some of the photographic situations will be found unfavorable. To say, as the focal length of the photographic lens varies, that area of the pattern which is to be measured is caused to vary. For example, when the standard lens is interchanged with a long focal length or telephoto lens, that portion of the pattern which is uniform covers the entire area of the range finder spot. Thus, the accurate detection of the image sharpness is no longer possible to perform easily.

Conversely when the full-TTL method is employed, the above-described drawback does not take place, but instead of it, a light projecting system for projecting the patterns must be mounted within the camera housing. As a result, the size of the camera is very increased, and ghost is produced by the multiple reflection of the projected light beam within the photographic lens mounting. The latter leads to lower the quality of the pattern image when it is projected and received. Thus, it becomes a cause of lowering the accuracy of the focus detection.

SUMMARY OF THE INVENTION

An object of the invention is to perform good focus detection even when an object is dim or its contrast is low.

Another object is to give the focus detecting apparatus a pattern form that makes it possible to detect accurately even when the focal length of the objective lens positioned in front of the apparatus has changed.

And, in order to perform the focus detection of a photographic lens by projecting a pattern of prescribed form from the camera onto an object to be photographed through a light projecting system and sensing the imaging state of the projected pattern on the object, the above-described pattern is constructed so that the spatial frequency lowers successively.

Also, in case when the telephoto lens is attached to the camera body or when the zoom lens is set in the telephoto side, the image of only the central portion of the projected region on the object is received. It is, therefore, preferred that the pattern for projection is so constructed that the spatial frequency of the central region is high, and it lowers toward the marginal region. The projection pattern may be regarded as an array of black bands on the white background, or as an array of white bands on the black background.

DETAILED DESCRIPTION OF THE PREFERRED EMBODIMENTS

Figure 1:
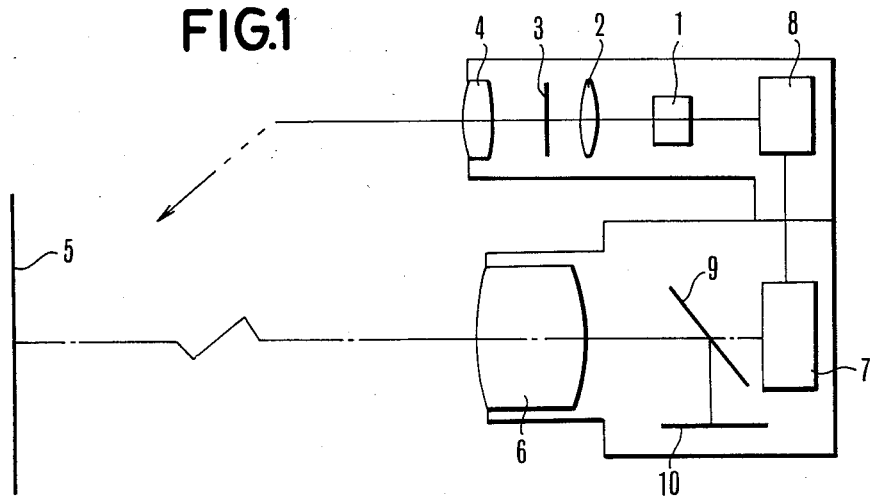
FIG. 1 is a schematic sectional view of the optics of an embodiment of the invention.
Figure 5:
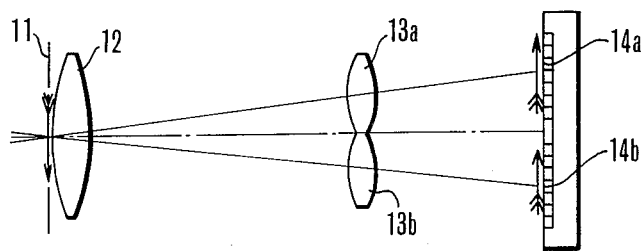
FIGS. 5 and 6 are sectional views of two examples of focus detecting apparatuses respectively.
Figure 6:
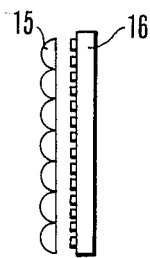
Figure 7:
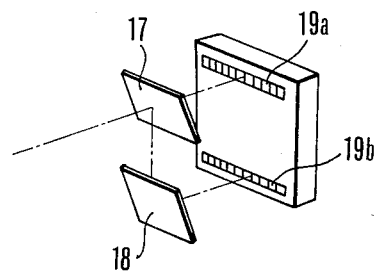
FIG. 7 is a perspective view of another example of the focus detecting apparatus.

FIG. 1 depicts how to amount a pattern projector in a single lens reflex camera having a focus detecting apparatus incorporated therein. For note, though the pattern projection may be incorporated within the camera body, it is better to build it in part of a strobe device. In FIG. 1, a light source 1 is, for example, an LED (light emitting diode) or the like. A collection lens 2 collects light rays from the light source 1. In recent years, an LED device having the collection lens adhered thereto is often used. A pattern chart 3 has a pattern of form to be described later on a transparent plate. 4 is a projection lens. These parts 1 to 4 are arranged in this order from the rear. 5 is an object to be photographed. 6 is a photographic lens. 7 is a detecting device for sensing the focusing state of an image of the object 5 to detect the focus adjusting state of the photographic lens 6. 8 is a drive circuit for energizing the light source 1 on the basis of the signal from the detecting device 7. The camera further includes a beam splitter 9 such as a half-mirror or a quick return mirror, and an image receptor 10 such as a silver halide film or solid state image pickup element. As the detecting device 7 use may be made of, for example, that shown in FIGS. 5, or 6 or 7. The device of FIG. 5 is proposed in Japanese Laid-Open Patent Application Nos. Sho 55-155331 and Sho 58-106511 and others. So, detailed explanation is not made here. Yet, a field stop 11 and a field lens 12 are arranged at or near the prescribed focal plane of the photographic lens 6 in front of a pair of secondary image forming lenses 13a and 13b whose optical axes are parallel to each other and to that of the field lens 12. With the use of this optical arrangement, the pair of second images move line-symmetrically depending on the focus adjusting state of the photographic lens. By sensing these two second images on respective arrays of photosensors 14a and 14b to determine the mutual position relationship of the paired images, therefore, the focus adjusting state of the photographic lens can be detected. In the arrangement of FIG. 6, an array of lenslets 15 lies at the prescribed focal plane of the photographic lens, and a sensor device 16 having a row of paired sensor elements is provided behind it to the mutual position relationship of the paired object images formed by the lenslet array 15. Also, in FIG. 7, the focus adjusting state of the photographic lens is detected on the basis of the defocusing of the image. The image forming optical path of the photographic lens is divided into two by a half-mirror 17 and a mirror 18, and the prescribed focal plane is optically sandwiched by photosensor arrays 19a and 19b. From the comparison of the degree of defocus of the images on the photosensor arrays 19a and 19b, the focus is detected.

In shotting the object with the camera of FIG. 1, when a release button (not shown) is slightly pushed down, the detecting device 7 operates to detect the focus adjusting state of the photographic lens 6 to the object 5. Upon further depression of the release button, the drive mechanism (not shown) performs focusing of the photographic lens 6 in response to the adjusting signal the detecting device 7 has formed. Then, the shutter (not shown) opens so that the image receptor 10 is exposed. However, when the brightness of the object is lower than a prescribed level, or when the object is of low constrast, the detecting device 7 detects the focus detection as difficult, producing an actuating signal for firing an auxiliary light which is applied to the drive circuit 8. The drive circuit 8 causes the light source 1 to produce light on the basis of the actuating signal from the detecting device 7. And, the light from the energized light source 1 illuminates the pattern chart 3, so that the pattern is projected onto the object by the projection lens 4. Then, the reflected pattern image from the object 5 is conducted to the detecting device 7 by the photographic lens 6. By detecting the focusing state of the pattern image formed on the detecting device 7, it performs the focus detection of the photographic lens 6.

Figure 2:
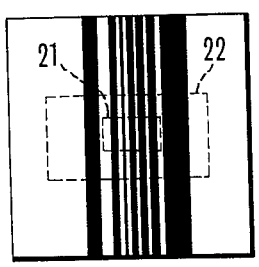
FIGS. 2, 3 and 4 are plan views of three examples of projection patterns respectively.
Figure 3:
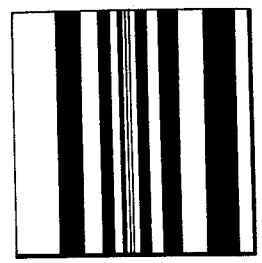
Figure 4:
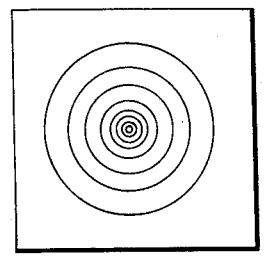

FIGS. 2 to 4 are taken to explain an embodiment of the pattern according to the present invention. The stripe pattern of FIG. 2 has such a geometry that a number of vertical lines are equally spaced from each other but increase in width as the distance from the center of the lateral length of the pattern chart 3 to either side increases. The pattern of FIG. 3 has such a geometry that a number of vertical lines increase in both width and spacing from the center toward either lateral side. The pattern of FIG. 4 has such a geometry that a number of concentric circles of constant width increase in spacing as the distance from the center toward the margin increases. The pattern of FIG. 4 is advantageous to a detecting device having a first pair of photosensor arrays arranged vertically as indicated at 14a and 14b in FIG. 5 and a second pair of photosensor arrays arranged in a perpendicular direction to the first pair.

In such a manner, the pattern in the embodiment of the invention is formed to such a shape that at least one of the line width and the spacing between the lines becomes progressively larger as the distance from the center to either side increases. In other words, the spatial frequency of the pattern lowers successively from the center to the margin.

By forming the pattern in such a shape, no matter what focal length the used photographic lens may take ranging from the telephoto lens to the wide angle lens, the property of the pattern on the object image formed by the photographic lens does not change. Thus, it is made possible to measure the object distance while maintaining the pattern always uniform.

For example, in FIG. 2, that portion of the pattern which is used for measuring the object distance when the focal length of the photographic lens is long falls in an area 21, while when it is short, in another area 22. However, in both cases, the pattern sensed for distance measurement has the same property in that the spatial frequency lowers progressively from the center to the margin. In the embodiment of the invention, by using such a pattern, the accuracy of focus detection is maintained always excellent independently of the focal length of the photographic lens.

Figure 8:
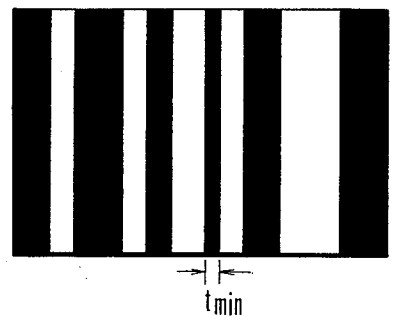
FIGS. 8, 9 and 10 are plan views of three examples of projection patterns respectively.
Figure 9:
Figure 10:
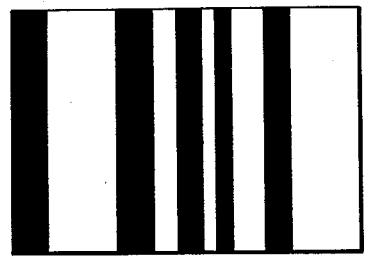

Particularly when the photographic lens of the camera is interchanged to the wide angle one, care must be taken of not having too much fine an image of the pattern on the row of photoelectric transducer elements of the focus detecting device. Or otherwise, there would be a high possibility of spoiling the high precision accuracy of the focus detecting device. For example, if width of any line of the pattern image on the aforesaid photosensor array becomes narrower than that of the picture element, it will be impossible for that type of focus detecting device which employs the defocusing method (FIG. 7) to be responsive even to an appreciable defocus as the line image even when so much defocused cannot cover the adjacent two of the picture elements. Also, if the focus detecting device employs the so-called image correlation method (FIG. 5, FIG. 6), even when the lateral shift is not negligible, so long as any of the line images does not cover at least two adjacent picture elements, the fact that the photographic lens is out of focus is also impossible to detect. Therefore, regardless of which method is in use, a criterion should be set forth in order to insure that the accuracy and reliability of focus detection is not lowered. On this account, as shown in FIGS. 8 to 10, for the minimum line width $t_{min}$, the following condition is given:

$$t_{min} > \frac{af}{35|\beta|} \quad (1)$$

where "a" is the width of one picture element of the photosensor array, "f" is the focal length of the projection lens and β is the magnifying power of the optics of the focus detecting device. Concerning β, in case when the photosensor array lies in the first image plane as in the defocus type focus detecting device, its value is unity. In another case when the second image forming optical system is in use, its value is equal to the magnification of the second image.

In general, the photographic situation where the projection of the pattern is required to detect the focusing state often happens when, as the object to be photographed is dim, an artificial light source such as strobe is in use. So, the above-defined condition is based on the assumption that the focal length of 35 mm generally finds its use as the normal one of wide angle lenses in flash photography. When the line width of the pattern is made too narrow beyond the lower limit, the use of 35 mm photographic lens will result in a bad influence on the accuracy of focus detection. For note, the minimum line width of the pattern image formed on the prescribed focal plane can be calculated by using the ratio of the focal lengths of the projection lens 4 and the photographic lens 6 as the magnification, thus being equal to t(35/f). Hence, the above-described inequality (1) is derived from the condition that the product of it and the magnification of the focus detecting device is larger than the width of one picture element, or $t(35/f)|\beta| > a$.

On another assumption that the shortest of the focal lengths of the wide angle lenses usable in flash photography is 20 mm, it is desirable that a line of that width which satisfies the following condition exists in the range finder area with the use of the 20 mm lens.

$$t > \frac{af}{20|\beta|} \quad (2)$$

When this condition is violated, if the lens of the camera is interchanged to a 20 mm lens, the only pattern on the photoelectric transducer element row is of a narrower width than that of one picture element, causing the accuracy of focus detection to lower.

For note, so long as the minimum line width $t_{mim}$ satisfies the condition (1), the narrower the actual line width, the greater the advantage, for as along focal length lens is in use, the entire area of the range finder spot is not shadowed by the diffused stripes of the pattern image. For note, concerning the maximum acceptable width $t_{max}$ of at least central one of the lines, for the use of a 100 mm lens which is the standard one in flash photography does not result in an unclearness of the range finder area, it is preferred to satisfy $f_{max} < fb/100$ where "b" is the range finder area on the prescribed focal plane.

According to the present invention, by specifying the form of the pattern projected from the camera onto an object to be photographed as stated above, regardless of a focal length the used photographic lens may have, the image of the pattern in the range finder area can be maintained almost constanting the structure of lines. Thus, a projection system which enables the automatic focus detection to be performed always with high accuracy and reliability can be realized.

Also, according to the present invention, by setting force the above-stated rules of design of the pattern to be projected from the camera to the object, even when the photographic lens is of wide angle, the image of the pattern for focus detection is prevented from becoming too much fine in the structure of the lines or concentric circles to allow for realization of a projection system for automatic focus detection which enables the accuracy with which the focus detection is performed to be kept always stable at high level.

What is claimed is:

1. A focus detecting system comprising:
   focus detecting means for detecting the focus adjusting state of an objective lens, having a photosensing apparatus; and
   projecting means for projecting a pattern which forms a highest spatial frequency in a central region of said focus detecting means and forms a lower spatial frequency toward a marginal region of said focus detecting means.

2. A system according to claim 1, wherein said pattern consists of a plurality of lines.

3. A focus detecting system comprising:
   focus detecting means for detecting the focus adjusting state of an objective lens, having a photosensing apparatus; and
   projecting means having pattern providing means for providing a pattern having a center portion surrounded by a margin and having sucessively lower spatial frequencies, whereby an image of said pattern is projected onto an object, wherein
   said pattern consists of a plurality of lines and spacing between said lines is constant, but the width of said lines increases as the distance from the center toward the margin increases.

4. A focus detecting system comprising:
   focus detecting means for detecting the focus adjusting state of an objective lens, having a photosensing apparatus; and
   projecting means having pattern providing means for providing a pattern having a center portion surrounded by a margin and having successively lower spatial frequencies, whereby an image of said pattern in projected onto an object, wherein
   said pattern consists of a plurality of lines and said lines have a width equal to one another, but the spacing between two of said lines in succession increases from the center toward the margin.

5. A system according to claim 2, wherein said lines have increasing widths and are spaced from each other at increasing distances, as the distance from the center to the margin increases.

6. A system according to claim 2, wherein said lines are white.

7. A system according to claim 2, wherein said lines are black.

8. A system according to claim 2, wherein said photosensing apparatus has a plurality of photosensors, and said projecting means has a projection lens, the shortest of the widths of said lines, $t_{min}$, satisfying the following condition:

$$t_{min} > \frac{af}{35|\beta|}$$

wherein "a" is the width of the photosensor, "f" is the focal length of said projection lens, and β is the magnifying power of the optics of said focus detecting means.

9. A pattern projecting device projecting a pattern onto an object to be detected by an auto focus detecting device, comprising:

a stripe pattern providing means for providing a pattern having successively lower spatial frequencies; and projecting optical means for projecting said pattern onto an object, wherein said pattern has a central region of highest spatial frequency, and the spatial frequency lowers toward a margin of said pattern.

10. A device according to claim 9, further comprising illuminating means for illuminating said pattern providing means.

11. A device according to claim 10, wherein said illuminating means has an LED.

12. A device according to claim 9, wherein said pattern providing means is a pattern-written transparent plate.

13. A device according to claim 9, wherein the pattern consists of a plurality of lines.

14. A device according to claim 13, wherein the spacing between said lines is constant, but the width of line increases as the distance from the center toward the margin increases.

15. A device according to claim 13, wherein said lines have an equal width to one another, but the spacing between the successive two of said lines increases from the center toward the margin.

16. A device according to claim 13, wherein said lines have increasing widths and are spaced from each other at increasing distances, as the distance from the center to the margin increases.

17. A device according to claim 13, wherein said lines are white.

18. A device according to claim 13, wherein said lines are black.

19. A device according to claim 13, wherein said photo-sensing apparatus has a plurality of photosensors, and said projecting means has a projection lens, the shortest of the widths of said lines, $t_{min}$, satisfying the following condition:

$$t_{min} > \frac{af}{35|\beta|}$$

wherein "a" is the width of the photosensor, "f" is the focal length of said projection lens, and $\beta$ is the magnifying power of the optics of said focus detecting means.

20. A focus detecting device for a magnification variable objective lens, comprising:

focus detecting mans for detecting a focus adjusting state of said objective lens, having a light receiving surface composed of a plurality of photosensor, and projecting means for projecting a pattern which forms a highest spatial frequency in a central region of said focus detecting means and forms a lower spatial frequency toward a marginal portion.

21. A system according to claim 20, wherein said pattern consists of a plurality of lines.

22. A system according to claim 20, wherein the spacing between said lines is constant, but the width of said lines increases as the distance from the center toward the margin increases.

23. A system according to claim 20, wherein said lines have an equal width to one another, but the spacing between two of said lines in succession increases from the center toward the margin.

24. A system according to claim 20, wherein said lines have increasing widths and are spaced from each other at increasing distances, as the distance from the center to the margin increases.

25. A system according to claim 20, wherein said lines are white.

26. A system according to claim 20, wherein said lines are black.

27. A system according to claim 20, wherein said photo-sensing apparatus has a plurality of photosensors, and said projecting means has a projection lens, the shortest of the widths of said lines, $t_{min}$, satisfying the following condition:

$$t_{min} > \frac{af}{35|\beta|}$$

wherein "a" is the width of the photosensor, "f" is the focal length of said projection lens, and $\beta$ is the magnifying power of the optics of said focus detecting means.

* * * * *

UNITED STATES PATENT AND TRADEMARK OFFICE
CERTIFICATE OF CORRECTION

PATENT NO. : 4,801,963

DATED : January 31, 1989

INVENTOR(S) : Koyama, et al.

It is certified that error appears in the above-identified patent and that said Letters Patent is hereby corrected as shown below:   Title page:

[56] REFERENCES CITED
   FOREIGN PATENT DOCUMENTS, change "4919810 5/1971 Japan." to --49-19810 2/1974 Japan.--.

COLUMN 1
   Line 29, change "contract" to --contrast--;
   Line 34, change "sufficident" to --sufficient--;
   Line 36, change "be" to --by--;
   Line 42, change "contast" to --contrast--; and
   Line 63, change "To say, as" to --As--.

COLUMN 3
   Line 39, change "shotting" to --shooting--.

COLUMN 4
   Line 40, delete "much".

COLUMN 5
   Line 43, change "minimum line width $t_{mim}$" to --minimum line width $t_{min}$--; and
   Line 45, change "along" to --a long--.
   Line 60, change "constanting" to --constant in--; and
   Line 65, change "force" to --forth--.

UNITED STATES PATENT AND TRADEMARK OFFICE
CERTIFICATE OF CORRECTION

PATENT NO. : 4,801,963

DATED : January 31, 1989

INVENTOR(S) : Koyama, et al.

It is certified that error appears in the above-identified patent and that said Letters Patent is hereby corrected as shown below:

<u>COLUMN 6</u>
    Line 1, delete "much".

<u>COLUMN 7</u>
    Line 16, change "the pat-" to --said pat---.

<u>COLUMN 8</u>
    Line 8, change "photosensor," to --photosensors,--.

Signed and Sealed this

Twentieth Day of February, 1990

Attest:

JEFFREY M. SAMUELS

*Attesting Officer*     *Acting Commissioner of Patents and Trademarks*